United States Patent
Ritter et al.

(10) Patent No.: US 10,487,898 B2
(45) Date of Patent: Nov. 26, 2019

(54) ROTARY DRIVE DEVICE COMPRISING LOAD-DEPENDENT BRAKES

(71) Applicant: Stabilus GmbH, Koblenz (DE)

(72) Inventors: Andreas Ritter, Hilgert (DE); Bernd Arenz, Herschbroich (DE); Jörg Hillen, Nörterhousen (DE); Oleg Batosky, Boppard (DE)

(73) Assignee: Stabilus GmbH, Koblenz (DE)

( * ) Notice: Subject to any disclaimer, the term of this patent is extended or adjusted under 35 U.S.C. 154(b) by 135 days.

(21) Appl. No.: 15/659,681

(22) Filed: Jul. 26, 2017

(65) Prior Publication Data
US 2018/0045261 A1 Feb. 15, 2018

(30) Foreign Application Priority Data
Aug. 9, 2016 (DE) .......................... 10 2016 214 774

(51) Int. Cl.
*F16D 7/02* (2006.01)
*F16H 25/20* (2006.01)
(Continued)

(52) U.S. Cl.
CPC ............. *F16D 67/00* (2013.01); *F16D 55/22* (2013.01); *F16D 59/00* (2013.01);
(Continued)

(58) Field of Classification Search
CPC .......... F16D 7/022; F16D 7/024; F16D 59/02; F16H 25/2454; F16H 2025/2071
See application file for complete search history.

(56) References Cited

U.S. PATENT DOCUMENTS

| 2,763,141 A | 9/1956 | Dodge |
| 3,327,826 A * | 6/1967 | Henschke ........... F16H 25/2015 |
| | | 192/141 |

(Continued)

FOREIGN PATENT DOCUMENTS

| DE | 102014100125 A1 * | 7/2015 | ......... F16H 25/2454 |
| EP | 2 789 869 A2 | 10/2014 | |

(Continued)

OTHER PUBLICATIONS

Machine translation of DE 102014100125A1, filed Mar. 3, 2019. (Year: 2019).*

(Continued)

*Primary Examiner* — Tisha D Lewis
(74) *Attorney, Agent, or Firm* — Rankin, Hill & Clark LLP

(57) ABSTRACT

A rotary drive device includes a housing element, a drive shaft and a driven shaft, both rotatably mounted in the housing element, a transmission device that transmits torque from the drive shaft to the driven shaft, and a braking device configured to counteract rotation of the drive shaft. The braking device includes a drive shaft input element, a braking element connected to the housing element for conjoint rotation, and a coupling element adjustable with respect to the input element. A braking force exerted by the braking device is greater when the coupling element is located in a first position than when located in a second position, and the coupling element assigned to the driven shaft so that adjustment from the first position to the second position is triggered by exceeding a threshold value of the difference in torque between the drive shaft and the driven shaft.

12 Claims, 4 Drawing Sheets

(51) Int. Cl.
*F16H 25/24* (2006.01)
*F16D 67/00* (2006.01)
*F16D 55/22* (2006.01)
*F16D 59/00* (2006.01)
*F16D 127/00* (2012.01)
*F16D 129/04* (2012.01)
*F16H 1/28* (2006.01)

(52) U.S. Cl.
CPC .... *F16D 2127/005* (2013.01); *F16D 2129/04* (2013.01); *F16H 1/28* (2013.01)

(56) References Cited

U.S. PATENT DOCUMENTS

| | | | | |
|---|---|---|---|---|
| 6,158,295 | A * | 12/2000 | Nielsen | F16H 25/20 192/223.4 |
| 8,193,755 | B2 * | 6/2012 | Jensen | H02K 7/102 318/119 |
| 9,021,905 | B2 * | 5/2015 | Reif | B60J 5/101 74/89.39 |
| 2005/0277512 | A1 * | 12/2005 | Gueler | E05F 15/603 475/317 |
| 2010/0186528 | A1 | 7/2010 | Hillen et al. | |
| 2015/0300468 | A1 * | 10/2015 | Ritter | F16H 25/2454 74/89.39 |
| 2017/0248210 | A1 * | 8/2017 | Muller | F16H 25/2021 |

FOREIGN PATENT DOCUMENTS

EP 2 789 869 A3 11/2015
KR 2002-0035553 5/2002

OTHER PUBLICATIONS

Extended European Search Report for European application No. 17 185 301.3, dated Feb. 9, 2018; 8 pages.

* cited by examiner

ROTARY DRIVE DEVICE COMPRISING LOAD-DEPENDENT BRAKES

BACKGROUND

The present invention relates to a rotary drive device, comprising a housing element, a drive shaft which is rotatably mounted in the housing element, a driven shaft which is rotatably mounted in the housing element, and a transmission device for transmitting a torque from the drive shaft to the driven shaft.

Rotary drive devices of this type are generally known. Said devices can be used firstly to provide a rotational movement on the driven shaft, which then drives additional components of a superordinate construction, or for example also in cooperation with a device for converting the rotational movement of the driven shaft into a longitudinal movement, such as a worm gear or the like. Variable-length units of this type, in which a rotational movement of a drive shaft is converted by means of a driven shaft and furthermore a device for converting the rotational movement into a longitudinal movement for varying the length of the unit as a whole, are used in particular in motor vehicles, for example for closing and opening engine bonnets, tailgates, luggage-compartment lids, doors and similar pivotable elements.

In known generic devices, however, no mechanism is provided which provides, according to a difference in torque between the drive shaft and the driven shaft, a braking force against the rotational movement of the drive shaft or driven shaft in the rotary drive device. However, it has been found that in particular there is a need for a rotary drive device in which, when the difference in torque increases, a decreasing braking force is provided according to the above-mentioned difference in torque between the drive shaft and the driven shaft, so that the rotary drive is braked strongly in the case of a low "stress" between the drive shaft and the driven shaft, i.e. for example between the motor which is assigned to the drive shaft and the component to be driven which is assigned to the driven shaft, whereas in the case of a high "stress" between the above-mentioned components, the braking effect is reduced or even completely eliminated.

BRIEF DESCRIPTION

The object of the present invention is thus that of providing a rotary drive device having braking characteristics of this type, which has a simple and reliable construction and can be produced in a cost-effective manner, in that known motor and gear-system assemblies can be used without modification.

This object is achieved by a rotary drive device of the above-mentioned type, in which the transmission device comprises a braking device which is configured to counteract a rotation of the drive shaft using a braking force, the braking device comprising an input element which is assigned to the drive shaft and can be rotatably driven thereby, a braking element which is connected to the housing element for conjoint rotation, and a coupling element which is adjustable with respect to the input element between a first position and a second position, the braking force exerted by the braking device being greater when the coupling element is located in the first position then when it is located in the second position, the coupling element further being assigned to the driven shaft in such a way that the adjustment thereof from the first position to the second position is triggered by exceeding a first threshold value of the difference in torque between the drive shaft and the driven shaft.

By providing the transmission device with the simply constructed braking device which has just been described, the above-mentioned desired braking characteristics of the rotary drive device are achieved in a simple design with only a few components, since neither the motor assembly nor the gear-system assembly of the rotary drive device has to be modified in comparison with known generic rotary drive devices.

In this case, a constant first braking force acts in the rotary drive device for as long as the difference in torque between the drive shaft and the driven shaft remains below the first threshold value, i.e. inter alia even if the drive shaft is inoperative, and when the first threshold value is exceeded, an adjustment of the coupling element from the first position to the second position is triggered. In this case, it should be noted that the first threshold value can indeed also be zero, and this is important in particular in the embodiment described further below, in which a continuous region of decreasing braking force is provided, it being possible in this case for the sweeping over the continuous region to begin, even with a minimum difference in torque.

According to the invention, a plurality of second positions are provided for the coupling element, in which a predetermined braking force is exerted in each case by the braking device, the coupling element further being able to be configured to transition into second positions having decreasing braking force when the difference in torque between the drive shaft and the driven shaft increases. For this purpose, in addition to the first position, a corresponding first threshold value is also assigned to each of the second positions (except for those having the lowest braking force), the coupling element transitioning in each case into the second position having the next lowest braking force value when said threshold value is exceeded. In this way, incremental braking characteristics of the rotary drive device are achieved, the braking force successively transitioning into smaller values when the difference in torque between the drive shaft and the driven shaft increases. In this case, the respective increments in the braking force between the individual second positions can be freely selected, for example following a linear course or also decreasing progressively or degressively.

Additionally or alternatively, the plurality of second positions can be formed at least in part by a continuous region having a braking force gradient, the coupling element being configured to pass through the continuous region in the direction of decreasing braking force when the difference in torque between the drive shaft and the driven shaft increases. In this development, by providing a continuous lowering of the braking force when the difference in torque between the drive shaft and the driven shaft increases, smooth braking characteristics are generated, and thus possible jerky rotation characteristics of the driven shaft are prevented from the outset.

Thus, a rotary drive device of this type is characterised by particularly quiet operation and a particularly sensitive response.

One example of an embodiment of a continuous region of decreasing braking force can be formed for example in such a way that when the difference in torque increases, a contact pressure between the braking element and the coupling element is continuously reduced, these two elements initially being displaced only minimally with respect to one another and therefore remaining in contact due to elastic deformation. In this embodiment, it can additionally be provided that, above a specific value of the difference in torque, the braking element and the coupling element are no longer in contact, as a result of which the braking device is then released, and the braking force decreases to substantially zero. In this case, both the continuous region of decreasing braking force and the configuration in which the braking element and the coupling element are no longer in contact correspond to second positions respectively.

In one development of the rotary drive device according to the invention, the coupling element can further be assigned to the driven shaft in such a way that the adjustment thereof from the second position to the first position is triggered by falling below a second threshold value of the difference in torque between the drive shaft and the driven shaft.

In this way, after the coupling element has occupied the second position, a constant second braking force is applied, which is smaller than the above-mentioned first braking force in the first position of the coupling element, until the difference in torque between the drive shaft and the driven shaft has fallen below the above-mentioned second threshold value. In this way, when the difference in torque changes in a small range around the first threshold value, the coupling element is prevented from repeatedly transitioning from the first position into the second position and back into the first position, which could lead to discontinuous or juddery braking characteristics of the rotary drive device and thus to increased impulses in the movement characteristics of the driven shaft.

Furthermore, optionally, in a similar manner, a second threshold value can also be assigned to each of the plurality of second positions so that when a specific second position having a predetermined braking force is reached, the transition back to the adjacent position having a greater braking force takes place only after falling below said second threshold value, by means of which the above-mentioned advantage of preventing discontinuous braking characteristics by frequently jumping between adjacent positions in each of the plurality of second positions can be ensured.

In one embodiment, the transmission device can further comprise a drive transmission element which is connected to the drive shaft for conjoint rotation and in a stationary manner, and a driven transmission element which is connected to the driven shaft for conjoint rotation and in such a way that it can be displaced along the driven shaft, the coupling element being connected to the driven transmission element for conjoint rotation and in a stationary manner. This configuration represents a particularly simple option for displacing the coupling element between different positions by displacing the driven transmission element between different positions and thus for achieving the desired braking characteristics of the rotary drive device.

In one development, the drive transmission element and the driven transmission element can be provided with at least one pair of cooperating angular faces which are configured to convert a relative rotation of the two transmission elements into a displacement of the driven transmission element along the driven shaft. In this way, by sliding the angular faces against one another, which is triggered by the difference in torque between the drive shaft and the driven shaft, the displacement of the driven transmission element along the driven shaft and thus of the coupling element with respect to the braking element can be achieved.

In this case, the relative rotation of the two transmission elements can be restricted to a predetermined maximum angle, for example by means of at least one pair of cooperating stops assigned to the two transmission elements. In this way, firstly an end position for the displacement of the coupling element with respect to the braking element can be provided, and secondly slippage between the drive transmission element and the driven transmission element and thus the drive shaft and the driven shaft can be prevented.

In order to ensure that, in an idle state, the driven transmission element and the drive transmission element are in a predefined positional relationship relative to one another and also transition back into said positional relationship when the operation of the rotary drive device is stopped, and secondly in order to determine the maximum acting braking force, a resilient element, such as a coil spring, can be provided which prestresses the driven transmission element towards the drive transmission element.

For this purpose, in particular the resilient element can be supported both on a support element assigned to the drive shaft and on an element, in particular the coupling element, which is assigned to the driven shaft. Furthermore, in particular the input element of the braking device can be carried on the support element assigned to the drive shaft. By means of this design, a transmission device comprising a braking device for a rotary drive device according to the invention is provided with a minimal number of required components.

Furthermore, in one development of the rotary drive device according to the invention, a motor driving the drive shaft and optionally a gear system, in particular a planetary gear system, can likewise be arranged inside the housing element. In this case, the gear system can be assigned to both the drive shaft and the driven shaft, wherein the braking device according to the invention can in particular advantageously be combined with a gear system assigned to the driven shaft.

Lastly, the present invention relates to a variable-length arrangement, comprising a rotary drive device according to the invention, and to a device for converting a rotational movement of the driven shaft into a longitudinal movement.

BRIEF DESCRIPTION OF THE DRAWINGS

Additional features and advantages of the present invention are clear from the following description when said description is considered in conjunction with the accompanying drawings, in which, in detail.

DETAILED DESCRIPTION

Figure 1:
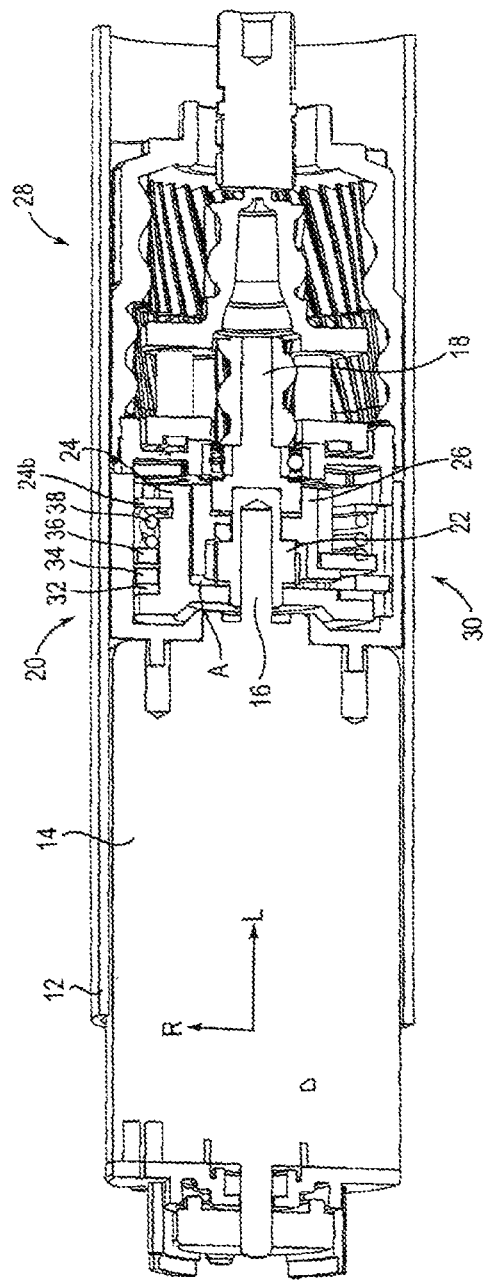
FIG. 1 is a longitudinal sectional view through an embodiment of a rotary drive device according to the invention.

In FIG. 1, an embodiment of a rotary drive device according to the invention is denoted very generally by the reference sign 10. It comprises a cylindrical housing element 12 having a radial direction R and a longitudinal direction L, which accommodates, in the interior thereof, a motor assembly 14, a drive shaft 16 which can be driven by the motor assembly, a driven shaft 18 and a transmission device 20 for transmitting a torque from the drive shaft 16 to the driven shaft 18. In this case, the motor assembly 14 is a known electrically operated rotary motor, in which, if desired, another gear-system unit can be provided between the motor 14 and the drive shaft 16.

On the drive shaft 16, a drive transmission element 22 is located which is attached for conjoint rotation and in a stationary manner, and, seen from the drive shaft 16, a support element 24 is located radially further out on said shaft, which support element is likewise connected to said shaft for conjoint rotation and in a stationary manner, a pocket-shaped recess A extending in the radial direction R and longitudinal direction L being formed between the drive transmission element 22 and the support element 24.

As a counterpart to the drive transmission element 22, the driven transmission element 26 is assigned to the driven-shaft 18, which element is accommodated in the recess A and is rotated together with the driven shaft 18, but is held so as to be displaceable by a predetermined amount with respect to said driven shaft in the longitudinal direction L, the mechanism for this displacement being described further below. The non-rotational, but longitudinally displaceable, accommodation of the driven transmission element 26 on the driven shaft 18 can take place for example by means of at least one cooperating tongue-and-groove pair.

At the same time, the driven shaft 18 is used, on the side thereof remote from the transmission device 20, as an input shaft for a planetary gear system 28, which reduces the rotation of the driven shaft 18 in a known manner and thereby drives an output shaft 28b at a reduced speed and with an increased torque in comparison with the driven shaft 18. Furthermore, the braking device 30 is assigned to the transmission device 20, for the description of which reference should be made to FIGS. 2a and 2b.

Figure 2A:
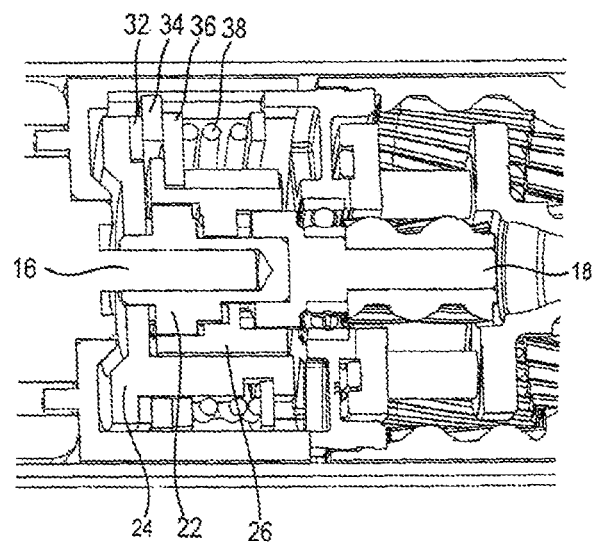
FIGS. 2a and 2b are enlarged views of the embodiment from FIG. 1 in the region of the transmission device in a first position and a second position respectively.
Figure 2B:
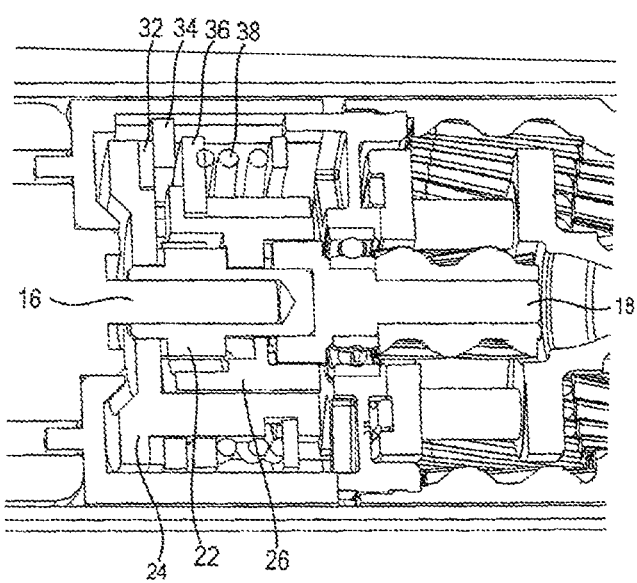

In this case, FIG. 2a shows a first position, and FIG. 2b shows a second position of the braking device 30. The braking device 30 firstly comprises an input element 32 which is assigned to the drive shaft 16 and can be rotatably driven thereby, a braking element 34 which is connected to the housing element for conjoint rotation, and a coupling element 36 which is assigned to the driven transmission element 26. In this case, the coupling element 36 is held on the driven transmission element 26 in a stationary manner and for conjoint rotation. Furthermore, the braking device 30 comprises a coil spring 38, which is supported both on the coupling element 36 and on the support element 24 via a protrusion 24b, and forms the resilient element according to the invention.

In the configuration shown in FIG. 2a, there is only a small difference in torque between the drive shaft 16 and the driven shaft 18, and in particular FIG. 2a also shows the idle state of the rotary drive device 10. In this case, by means of the effect of the coil spring 38, the coupling element 36 is pressed against the braking element 34, as a result of which on the one hand the side of the braking element 34 remote from the coupling element 36 presses against the input element 32, and on the other hand the driven transmission element 26 is also pressed against the drive transmission element 22 by means of the effect of the spring 38.

Since the drive transmission element 22 and the driven transmission element 26 are provided with angular faces, which are described in the following with reference to FIGS. 3a and 3b, in the position shown in FIG. 2a, torque is transmitted between the drive shaft 16 and the driven shaft 18 via the two transmission elements 22 and 26. In this case, however, by pressing the coupling element 36 against the braking element 34 and thus the braking element 34 against the input element 32, a braking force is generated, which counteracts the rotation of the input shaft 16. In particular, in the idle state of the motor 14, a rotation of the driven shaft 18 is prevented by said braking force, and therefore the rotary drive device 10 is self-locking by means of the braking device 30.

Figure 3A:
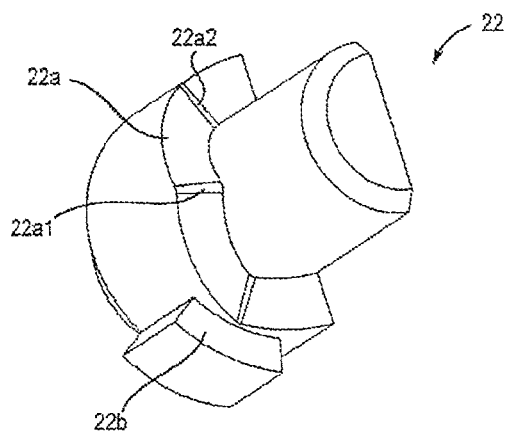
FIGS. 3a and 3b are enlarged views of the drive transmission element and of the driven transmission element respectively from the embodiment from FIGS. 1, 2a and 2b.
Figure 3B:
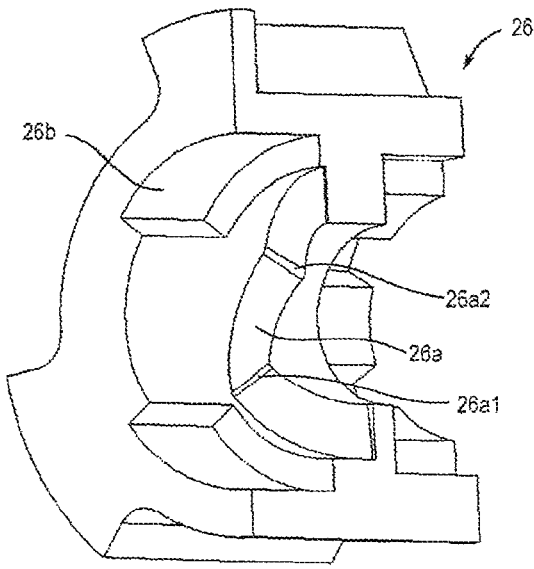

For clarification of the state from FIG. 2b, which incidentally also corresponds to the view from FIG. 1, anticipatory reference is now made to FIGS. 3a and 3b, in which the drive transmission element 22 and the driven transmission element 26 respectively are shown. The respective views in FIGS. 3a and 3b of the two transmission elements 22 and 26 are each from a perspective which corresponds to an oblique view of the contact region between the two transmission elements 22 and 26.

Figure 4:
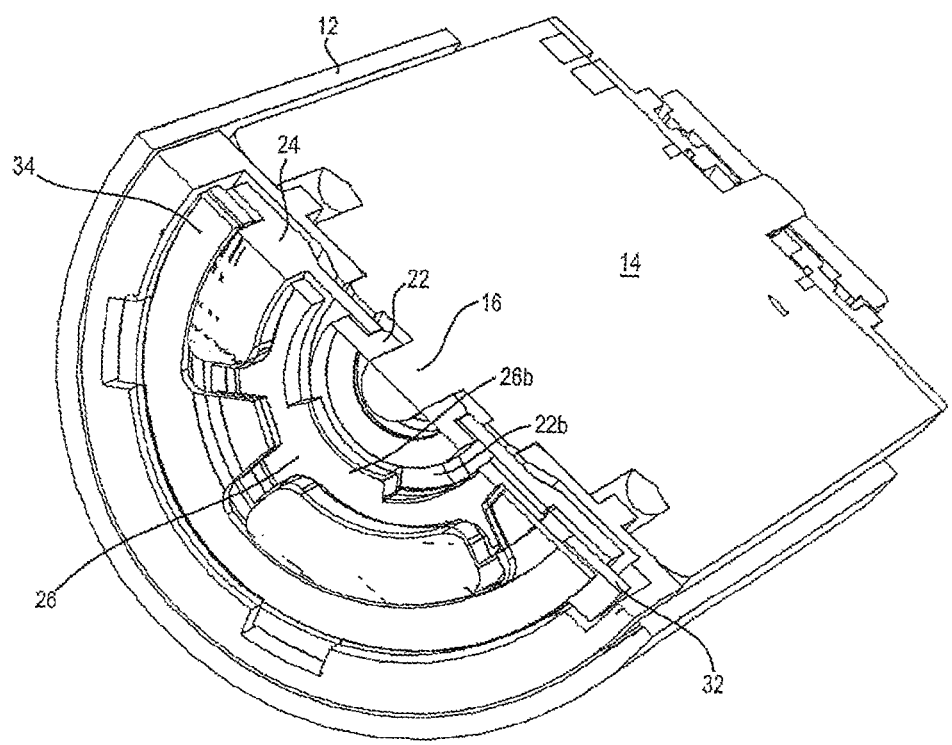
FIG. 4 is a cross section through the view from FIG. 1 in the region of the transmission device.

The two transmission elements 22 and 26 are each provided with angular faces 22a and 26a, through which on the one hand a torque can be transmitted between the two transmission elements 22 and 26 and thus the drive shaft 16 and the driven shaft 18, and which on the other hand can also bring about a displacement of the two transmission elements 22 and 26 with respect to one another in the longitudinal direction L. Furthermore, the transmission elements 22 and 26 are provided with cooperating stops 22b and 26b, which both define the relative rotation angle between the two transmission elements 22 and 26, as will be discussed in the following with reference to FIG. 4, and take over the transmission of the torque between the two transmission elements 22 and 26 when this maximum relative rotation angle occurs.

In the position shown in FIG. 2a, in which the drive transmission element 22 and the driven transmission element 26 are pressed against one another by the effect of the coil spring 38, the protruding region 22a1 of the angular face 22a of the drive transmission element 22 is inserted precisely in the recessed region 26a2 of the angular face 26a of the driven transmission element 26, whereas the protruding region 26a1 of the angular face 26a of the driven transmission element 26 is inserted in the recessed region 22a2 of the angular face 22a of the drive transmission element 22. Since, as discussed, the difference in torque between the drive shaft 16 and the driven shaft 18 is small in this case, the torque can be transmitted through the cooperating angular faces 22a and 26b by the pressing effect of the coil spring.

If, however, the difference in torque increases above a first threshold value which is determined inter alia by the rigidity of the spring 38, then the cooperating angular faces 22a and 26a slide against one another in the direction of rotation in opposition to the pressing effect of the coil spring 38. As a result, an axial displacement of the two transmission elements 22 and 26 with respect to one another takes place, and the driven transmission element 26 moves on the driven shaft away from the drive shaft in the longitudinal direction L, it being possible for this displacement to be facilitated by the above-mentioned tongue-and-groove system. In this case, the driven transmission element 26 carries along the coupling element 36 which is rigidly connected thereto, whereupon firstly the contact pressure between the coupling element 36 and the braking element 34 is reduced, until finally the coupling element 36 goes out of contact with the braking element 34. During this process, the acting braking force of the braking device 30 is successively reduced. The state in which the coupling element 36 and the braking element 34 are no longer in contact is shown in FIG. 2b.

In FIGS. 2a and 2b, in order to better illustrate the driven transmission element 26, the same angular orientation is shown in each case, whereas the drive transmission element 22 is rotated with respect to the driven transmission element 26 to such an extent that the cooperating stops 22*b* and 26*b* of the two transmission elements 22 and 26 come into contact and practically completely take over the transmission of the torque between the drive shaft 16 and the driven shaft 18. This abutment of the two stops 22*b* and 26*b* against one another is shown again in FIG. 4 for clarification, in this case, the rotation of the drive shaft 16 taking place in the clockwise direction, as a result of which the stop 22*b* presses against the stop 26*b*, so that the drive torque of the drive shaft 16 is transmitted to the driven transmission element 26 and thus the driven shaft 18 via the drive transmission element 22 which is rigidly connected to said drive shaft.

As soon as the difference in torque between the drive shaft 16 and the driven shaft 18 decreases again to a sufficient extent, for example at the end of a drive process, the effect of the coil spring 38 ensures that the two transmission elements 22 and 26 slide along the cooperating angular faces 22*a* and 26*a* thereof again, back into the position shown in FIG. 2*a*.

The invention claimed is:

1. Rotary drive device, comprising:
   a housing element;
   a drive shaft which is rotatably mounted in the housing element;
   a driven shaft which is rotatably mounted in the housing element; and
   a transmission device for transmitting a torque from the drive shaft to the driven shaft;
   wherein the transmission device comprises a braking device which is configured to counteract a rotation of the drive shaft using a braking force, the braking device comprising:
   an input element which is assigned to the drive shaft and can be rotatably driven thereby;
   a braking element which is connected to the housing element for conjoint rotation; and
   a coupling element which is adjustable with respect to the input element between a first position and a second position, the braking force exerted by the braking device being greater when the coupling element is located in the first position than when it is located in the second position;
   the coupling element further being assigned to the driven shaft in such a way that the adjustment thereof from the first position to the second position is triggered by exceeding a first threshold value of the difference in torque between the drive shaft and the driven shaft.

2. Rotary drive device according to claim 1 wherein a plurality of second positions are provided for the coupling element, in which a predetermined braking force is exerted in each case by the braking device, and the coupling element is configured to transition into second positions having decreasing braking force when the difference in torque between the drive shaft and the driven shaft increases.

3. Rotary drive device according to claim 2, wherein the plurality of second positions are formed by a continuous region having a braking force gradient, the coupling element being configured to pass through the continuous region in the direction of decreasing braking force when the difference in torque between the drive shaft and the driven shaft increases.

4. Rotary drive device according to claim 1, wherein the coupling element is further assigned to the driven shaft in such a way that the adjustment thereof from the second position to the first position is triggered by falling below a second threshold value of the difference in torque between the drive shaft and the driven shaft.

5. Rotary drive device according to claim 1, wherein the transmission device further comprises a drive transmission element which is connected to the drive shaft for conjoint rotation and in a stationary manner, and a driven transmission element which is connected to the driven shaft for conjoint rotation and in such a way that it can be displaced along the driven shaft, the coupling element being connected to the driven transmission element for conjoint rotation and in a stationary manner.

6. Rotary drive device according to claim 5, wherein the drive transmission element and the driven transmission element are provided with at least one pair of cooperating angular faces which are configured to convert a relative rotation of the two transmission elements into a displacement of the driven transmission element along the driven shaft.

7. Rotary drive device according to claim 6, wherein the relative rotation of the two transmission elements is restricted to a predetermined angle by at least one pair of cooperating stops assigned to the two transmission elements.

8. Rotary drive device according to claim 5, wherein a resilient element is provided, which prestresses the driven transmission element towards the drive transmission element.

9. Rotary drive device according to claim 8, wherein the resilient element is supported both on a support element assigned to the drive shaft and on an element, in particular the coupling element, assigned to the driven shaft.

10. Rotary drive device according to claim 9, wherein the input element of the braking device is carried on the support element assigned to the drive shaft.

11. Rotary drive device according to claim 1, wherein a motor driving the drive shaft and optionally a gear system, in particular a planetary gear system, are likewise arranged inside the housing element.

12. Variable-length arrangement, comprising a rotary drive device according to claim 1 and a device for converting a rotational movement of the driven shaft into a longitudinal movement.

* * * * *